US012418588B2

(12) United States Patent
Morand

(10) Patent No.: US 12,418,588 B2
(45) Date of Patent: Sep. 16, 2025

(54) METHOD OF STREAMING INDUSTRIAL TELEMETRY DATA FROM AN INDUSTRIAL SITE WITH CONGESTION CONTROL AND PAYLOAD SIZE OPTIMISATION

(71) Applicant: Schneider Electric Industries SAS, Rueil Malmaison (FR)

(72) Inventor: Denis Morand, Châteauneuf-Villevieille (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 58 days.

(21) Appl. No.: 18/536,382

(22) Filed: Dec. 12, 2023

(65) Prior Publication Data

US 2024/0223658 A1    Jul. 4, 2024

(30) Foreign Application Priority Data

Dec. 28, 2022    (EP) .................................... 22307058

(51) Int. Cl.
*H04L 67/12* (2022.01)
*G16Y 40/10* (2020.01)
*H04L 41/16* (2022.01)

(52) U.S. Cl.
CPC .............. *H04L 67/12* (2013.01); *G16Y 40/10* (2020.01); *H04L 41/16* (2013.01)

(58) Field of Classification Search
CPC .......... H04L 67/12; H04L 41/16; G16Y 40/10
See application file for complete search history.

(56) References Cited

U.S. PATENT DOCUMENTS

2018/0246926 A1*  8/2018  Altaf ...................... G06F 16/215
2018/0353106 A1* 12/2018  Han ....................... A61B 5/0024
2022/0053046 A1    2/2022  Morand
(Continued)

FOREIGN PATENT DOCUMENTS

CN          115226138 A       10/2022

OTHER PUBLICATIONS

Kfoury, Elie F. et al. "An Exhaustive Survey on P4 Programmable Data Plane Switches: Taxonomy, Applications, Challenges, and Future Trends", arxiv.org, Cornell University Library, Feb. 1, 2021, 51 pages.

(Continued)

*Primary Examiner* — Chris Parry
*Assistant Examiner* — Abderrahmen Chouat
(74) *Attorney, Agent, or Firm* — Troutman Pepper Locke LLP

(57) ABSTRACT

A method of streaming data elements from an industrial site to a remote server, including: receiving data elements from industrial devices on the industrial site, storing the data elements in a queue, periodically extracting a number N of data elements from the queue and aggregating the same into one data frame whose size does not exceed a maximum size, storing each data frame in a buffer, and periodically extracting a data frame from the buffer and sending the same to the remote server. A data element is removed from the queue and stored in a database if the data element's time in the queue exceeds a maximum queuing time. A data frame is stored in the database instead of being stored in the buffer if the buffer is full. The maximum queuing time and the number N are then optimised.

11 Claims, 1 Drawing Sheet

(56) References Cited

U.S. PATENT DOCUMENTS

2023/0388206 A1* 11/2023 Sandhaus ............ H04L 43/0817
2024/0073118 A1*  2/2024 Gafni .................. H04L 67/12
2024/0073152 A1*  2/2024 Cocker ................ H04L 47/564

OTHER PUBLICATIONS

European Search Report and Search Opinion dated Jun. 5, 2023 for corresponding European Patent Application No. EP22307058.2, 11 pages.

* cited by examiner

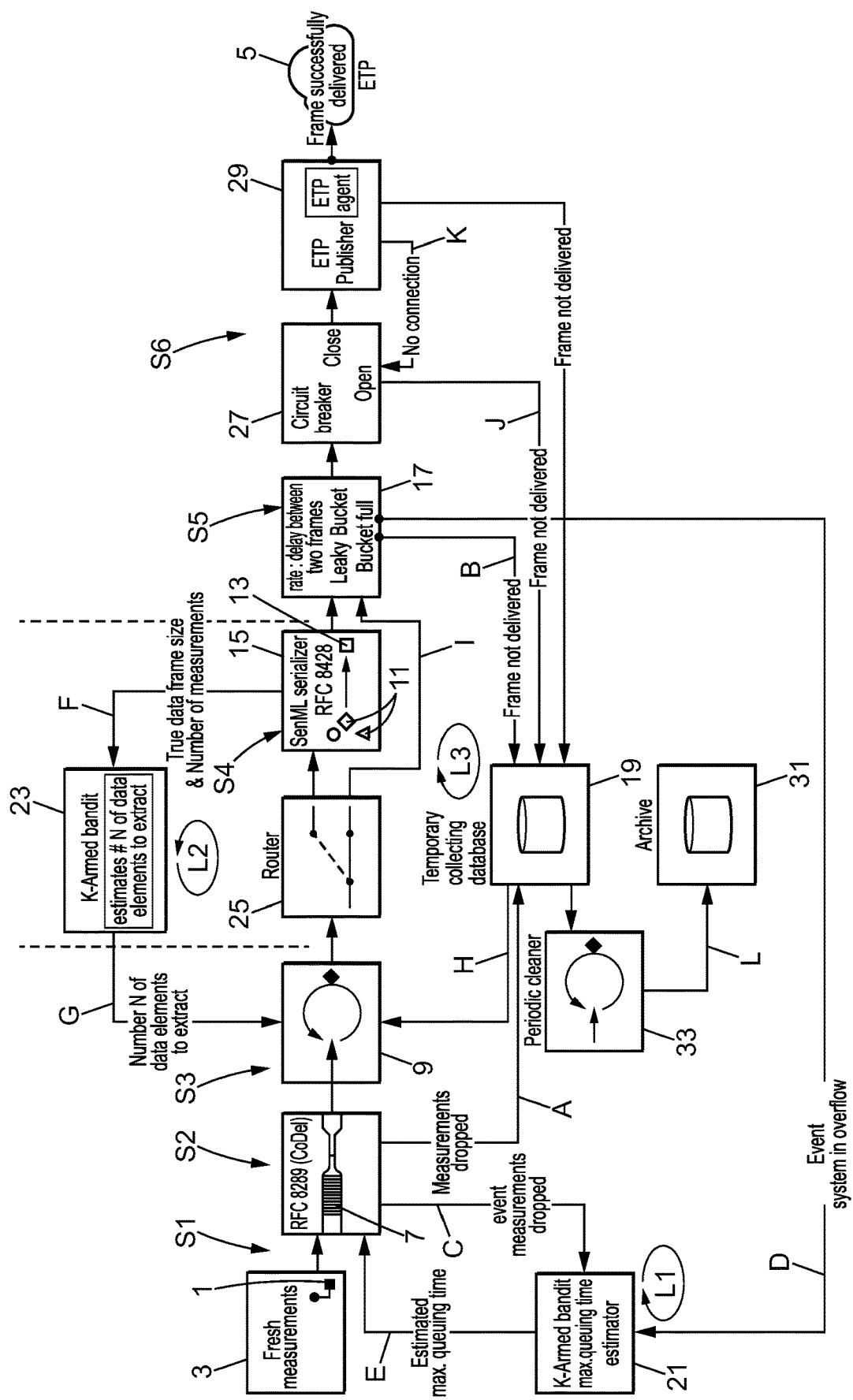

METHOD OF STREAMING INDUSTRIAL TELEMETRY DATA FROM AN INDUSTRIAL SITE WITH CONGESTION CONTROL AND PAYLOAD SIZE OPTIMISATION

TECHNICAL FIELD

This disclosure pertains to the field of remote monitoring of industrial sites. More particularly, it relates to the management of the flow of operating data from numerous industrial devices on an industrial site to remote servers in the so-called cloud, in the context of the industrial internet of things.

BACKGROUND ART

Document EP 3 955 128 A1 describes a method of publishing data elements related to industrial devices operating on an industrial site at regular intervals, such as every ten minutes. In this method, the data elements generated by the industrial devices are combined into files, for example JSON-files, and the files are continuously stored in a source database. The actual publishing is done by regularly extracting a set of files from the source database, compressing it, and sending it to an application server. More precisely, each regular publishing process involves the following steps:
- files are extracted from the source database and stored in another database in a priority queue;
- a first set of files is removed from the priority queue;
- a scheduling algorithm and a reinforcement learning algorithm are applied to the first set of files to obtain a second set of files with a number of files optimised so that, after compression, the size of the second set of files does not exceed a maximum size;
- the second set of files is compressed; and
- the compressed second set of files is published by transmitting it to an application server.

Accordingly, in this known method, the collection of data elements from industrial devices and their storage on the one hand, and the publication of data elements related to the industrial devices on the other hand, are two separate and decoupled processes. While the collection and storage of data elements is a continuous process, the publication of data elements is done periodically according to a well-defined schedule.

Consequently, this known method requires substantial storage capacity to store the data elements collected from the industrial devices at least until they have been published in line with the publishing schedule. Also, with this known method, precise remote monitoring of an industrial site is limited, due to the non-negligible timespan (10 minutes) between the publication of two consecutive file sets.

SUMMARY

In view of the above, it is an object of the present disclosure to provide an improved method of transmitting industrial telemetry data elements from an industrial site to a remote server. This improved method should be suited to the streaming of industrial telemetry data elements, i.e., should allow the transmission of the data elements from their origin (the industrial devices) to the remote server in a quasi-continuous flow.

According to the present disclosure, this object is achieved with a method of streaming industrial telemetry data elements from an industrial site to a remote server, the method comprising the following steps: receiving a stream of industrial telemetry data elements from a multitude of industrial devices operating on the industrial site, storing each received industrial telemetry data element in a data elements queue, periodically extracting a number N of data elements from the data elements queue and aggregating the extracted N data elements into one data frame, such that the size of the resulting data frame does not exceed a maximum frame size, storing each resulting data frame in a data frames buffer, and periodically extracting a data frame from the data frames buffer and sending the extracted data frame to the remote server, wherein a data element is removed from the data elements queue and stored in a collecting database as an excess data element if the time the data element has spent in the data elements queue exceeds a maximum queuing time, wherein a data frame is stored in the collecting database as an excess data frame instead of being stored in the data frames buffer if the data frames buffer is full, wherein the maximum queuing time is optimised in real time as a function of the latest number of data elements removed from the data elements queue and the frequency at which the data frames buffer is full, and wherein the number N of data elements extracted in step c is optimised in real time in view of the size of the latest resulting data frame and of the number of data elements aggregated into this data frame, while respecting said maximum frame size.

Indeed, in this method, the data elements from the industrial devices transit with little or no delay towards the remote server. In case of congestion, data elements and/or data frames are dropped into a collecting database to restore a steady data flow. The data elements queue and the data frames buffer provide the flexibility that is needed for a reliable streaming of the data elements. Thanks to the queue and to the buffer, the data flow can be managed and adapted as a function of the amount of traffic. The memory footprint of the present method is small, so that it can be executed by a resource-constrained device, such as an IoT gateway. According to the present method, by constantly optimising the maximum queuing time and the number N of extracted data elements, few data elements are dropped, and the amount of data pushed to the remote server is increased.

The following features can be optionally implemented, separately or in combination with each other:
- the maximum queuing time and/or the number N of extracted data elements is/are optimised using a machine learning algorithm, such as a Multi-Armed Bandit algorithm;
- the data elements queue is implemented via an active queue management algorithm, such as a CoDel algorithm;
- the data frames buffer is implemented via a Leaky Bucket algorithm;
- the aggregation of extracted data elements into one data frame in step c is a serialization, preferably a serialization of extracted data elements into one Sensor Measurement List, SenML;
- the collecting database is a temporary database, which stores the excess data elements and excess data frames for later delivery to the remote server, and wherein excess data elements and/or excess data frames are periodically retrieved from the collecting database and added to the data frames buffer to be sent to the remote server, where applicable, after aggregation;
- if the connection to the remote server is lost, in step e, attempts to send data frames extracted from the data frames buffer to the remote server are stopped and instead, until the end of a predetermined timeout, extracted data frames are stored in the collecting database;

the industrial telemetry data elements include measurements of operating parameters of industrial machines;

excess data elements and excess data frames whose storage time in the collecting database exceeds a predetermined threshold are transferred from the collecting database to a permanent archive.

The present disclosure also provides a computing device, in particular an IoT gateway, configured for carrying out a method as defined above.

A further aspect of the present disclosure is a computer software comprising instructions to implement a method as defined above when the software is executed by a processor.

A further aspect of the present disclosure is a computer-readable non-transient storage medium on which said computer software is stored.

BRIEF DESCRIPTION OF THE DRAWING

The features, details and advantages of the present disclosure will become more readily apparent from the following detailed description and the accompanying FIGURE, which illustrates how an IoT gateway according to one embodiment of the present disclosure processes a stream of measurements coming from an industrial site, and how the IoT gateway pushes the processed measurements to a remote server in the cloud.

DESCRIPTION OF EMBODIMENTS

The only drawing shows the different processing stages in one exemplary embodiment of the method according to the present disclosure.

The method exemplified by the drawing is a method of streaming industrial telemetry data elements 1 from an industrial site 3 to a remote server in the Cloud 5. Typically, this method is executed by a computing device, such as an IoT gateway, which sits between the industrial site 3 and the Cloud 5.

The method shown in the FIGURE comprises the following steps:

In a first step S1, the IoT gateway receives a stream of industrial telemetry data elements 1 (here, sensor measurements) from a multitude of industrial devices operating on the industrial site 3.

In a second step S2, each received industrial telemetry data element is stored in a data elements queue 7.

In a step S3, an extractor 9 periodically extracts a number N of data elements from the data elements queue 7.

In a subsequent step S4, the extracted data elements (identified by the reference number 11) are aggregated into one data frame 13, preferably by a serializer 15. The aggregation is done such that the size of the resulting data frame 13 does not exceed a maximum frame size.

In a next step S5, each resulting data frame 13 is stored in a data frames buffer 17.

In a final step S6, a data frame is periodically extracted from the data frames buffer 17 and sent to the remote server in the Cloud 5.

To manage the flow of the data elements 1 from the industrial site 3 to the Cloud 5, and in particular to avoid congestion, the method shown in the FIGURE provides the two following measures:

In the first measure, a data element is removed from the data elements queue 7 and stored in a collecting database 19 as an excess data element if the time the data element has spent in the data elements queue 7 exceeds a maximum queuing time. This is illustrated by the arrow A in the FIGURE.

In the second measure, a data frame 13 is stored in the collecting database 19 as an excess data frame instead of being stored in the data frames buffer 17 if the data frames buffer 17 is full. This is illustrated by the arrow B in the FIGURE.

The shown method includes a first control loop L1 to optimise the maximum queuing time associated with the data elements queue 7. According to this control loop L1, the maximum queuing time is optimised in real time as a function of the latest number of data elements removed from the data elements queue 7 and the frequency at which the data frames buffer 17 is full.

In the shown example, the maximum queuing time is optimised using a machine learning algorithm, namely a first Multi-Armed Bandit algorithm 21. The two inputs of the first Multi-Armed Bandit algorithm 21 are identified by the arrows C and D in the FIGURE. As already mentioned, one input is the latest number of data elements dropped from the data elements queue 7 (arrow C), and the other input is the overflow frequency of the data frames buffer 17 (arrow D). The output of the first Multi-Armed Bandit algorithm 21 is an updated estimation of the maximum queuing time, cf. Arrow E in the FIGURE.

The illustrated method also includes a second control loop L2 to optimise the number N of data elements that are periodically extracted by the extractor 9. The number N of extracted data elements is optimised in real time in view of the size of the latest resulting data frame 13 and of the number of data elements 11 aggregated into this data frame, while respecting the maximum size that a data frame 13 may have (e.g., 256 KB). In the shown example, the optimisation loop L2 is implemented using a machine learning algorithm, namely a second Multi-Armed Bandit algorithm 23. The input of the second Multi-Armed Bandit algorithm 23 is identified by the arrow F, and the output by the arrow G.

Preferably, the data elements queue 7 is implemented via an active queue management algorithm, such as a CoDel algorithm, in accordance with the RFC 8289 standard.

The data frames buffer 17 is preferably implemented via a Leaky Bucket algorithm. The purpose of such a Leaky Bucket algorithm 17 is to deliver data frames for publishing at a constant rate. The Leaky Bucket algorithm 17 ensures a constant delay between each data frame transmission to the remote server in the Cloud 5. This constant delay is a parameter of the Leaky Bucket algorithm 17, which may be set by a user depending on the use case. The constant delay may for example be 10 milliseconds.

Another parameter of the Leaky Bucket algorithm 17 is the buffer size, i.e., the size of the "leaky bucket". Incoming data frames 13 are continuously added to the buffer (the "leaky bucket") as long as the overall size of the data frames stored in the buffer does not exceed the buffer size. In an overflow situation, i.e., when the "leaky bucket" is full, the first control loop L1 adapts the maximum queuing time to reduce the fill level of the "leaky bucket" and stop the overflow. For example, the first control loop L1 may first raise the maximum queuing time and then reduce it.

The serializer 15 is preferably a Sensor Measurement List, SenML, serializer according to the RFC 8428 standard.

The collecting database 19 is a temporary database, which stores the excess data elements and excess data frames for later delivery to the remote server in the Cloud 5. As indicated by arrow H, excess data elements and excess data frames are periodically retrieved from the collecting database 19 and added to the data frames buffer 17 to be sent to the remote server. This delivery retrying amounts to a third control loop L3. More precisely, an excess data element, whose delivery is to be retried, is sent by a router 25 to the serializer 15 to be included into a data frame 13 before being added to the data frame buffer 17 as part of the data frame 13. An excess data frame, whose delivery is to be retried, is directly added by the router 25 to the data frames buffer 17, bypassing the serializer 15 (cf. arrow I).

In the illustrated embodiment, the method also includes a circuit breaker algorithm 27. This algorithm stops attempts to send data frames to the remote server if the connection thereto is lost. In this case, data frames leaving the data frames buffer 17 are diverted into the collecting database 19 until the end of a predetermined timeout, cf. arrow J. After the end of the timeout, if the connection with the remote server has been re-established, sending of data frames leaving the data frames buffer to the remote server resumes. As shown in the FIGURE, cf. arrow K, the information that the connection to the remote server is lost may be provided to the circuit breaker algorithm 27 by an ETP publisher algorithm 29. The ETP publisher algorithm 29 is in charge of the actual publication of the data frames to the Cloud 5. The ETP publisher algorithm 29 is only exemplary and may be replaced by any other appropriate cloud communication protocol.

The purpose of the circuit breaker algorithm 27 is to give the ETP publisher algorithm 29 sufficient time to re-establish a connection with the Cloud 5. Indeed, the time needed by the ETP publisher algorithm 29 to reconnect to the Cloud 5 is usually longer than the constant delay between two consecutive data frames leaving the data frames buffer 17.

In the illustrated method, excess data elements and excess data frames, whose storage time in the collecting database 19 exceeds a predetermined threshold, are transferred from the collecting database 19 to a permanent archive 31, cf. arrow L. More precisely, each excess data element and each excess data frame is stored in the collecting database 19 with a Time To Live, TTL. If the TTL of the data element/data frame has expired, a periodic cleaning algorithm 33 extracts the same from the collecting database 19 and transfers it to the permanent archive 31.

The streaming method of the present disclosure has in particular the following advantages:

Thanks to the two auto-adaptive machine learning control loops L1 and L2, the method only requires little configuration from a user. In particular, a user does not need to set the number N for the periodic measurements extraction and serialisation. Also, the user does not need to set the maximum queuing time. These two parameters are notoriously difficult to estimate. Accordingly, thanks to the two control loops L1 and L2, the method of the present disclosure is auto-adaptive to the number of incoming data elements, optimises the size of the frames to be sent to the remote server, and minimizes the amount of data lost during the streaming.

Also, the method of the present disclosure is particularly suited for running on resource-constrained devices because it only requires a limited amount of memory.

Furthermore, only very old data elements/data frames are dropped into a permanent archive, where they can still be extracted manually by a user. Hence, data is never definitely lost.

The invention claimed is:

1. A method of streaming industrial telemetry data elements from an industrial site to a remote server, the method comprising:
   receiving a stream of industrial telemetry data elements from a multitude of industrial devices operating on the industrial site;
   storing each received industrial telemetry data element in a data elements queue;
   periodically extracting a number N of data elements from the data elements queue and aggregating the extracted N data elements into one data frame, such that the size of the resulting data frame does not exceed a maximum frame size;
   storing each resulting data frame in a data frames buffer; and
   periodically extracting a data frame from the data frames buffer and sending the extracted data frame to the remote server,
   wherein a data element is removed from the data elements queue and stored in a collecting database as an excess data element if the time the data element has spent in the data elements queue exceeds a maximum queuing time,
   wherein a data frame is stored in the collecting database as an excess data frame instead of being stored in the data frames buffer if the data frames buffer is full,
   wherein the maximum queuing time is optimised in real time as a function of:
      the latest number of data elements removed from the data elements queue; and
      the frequency at which the data frames buffer is full, and
   wherein the number N of data elements extracted is optimised in real time in view of the size of the latest resulting data frame and of the number of data elements aggregated into this data frame, while respecting said maximum frame size.

2. The method according to claim 1, wherein the maximum queuing time and/or the number N of extracted data elements is/are optimised using a machine learning algorithm, such as a Multi-Armed Bandit algorithm.

3. The method according to claim 1, wherein the data elements queue is implemented via an active queue management algorithm, such as a CoDel algorithm.

4. The method according to claim 1, wherein the data frames buffer is implemented via a Leaky Bucket algorithm.

5. The method according to claim 1, wherein the aggregation of extracted data elements into one data frame is a serialization, preferably a serialization of extracted data elements into one Sensor Measurement List, SenML.

6. The method according to claim 1, wherein the collecting database is a temporary database, which stores the excess data elements and excess data frames for later delivery to the remote server, and wherein excess data elements and/or excess data frames are periodically retrieved from the collecting database and added to the data frames buffer to be sent to the remote server, where applicable, after aggregation.

7. The method according to claim 1, wherein, if the connection to the remote server is lost, attempts to send data frames extracted from the data frames buffer to the remote server are stopped and instead, until the end of a predetermined timeout, extracted data frames are stored in the collecting database.

8. The method according to claim 1, wherein the industrial telemetry data elements include measurements of operating parameters of industrial machines.

9. The method according to claim 1, wherein excess data elements and excess data frames whose storage time in the collecting database exceeds a predetermined threshold are transferred from the collecting database to a permanent archive.

10. A computing device, in particular an IoT gateway, configured for carrying out the method according to claim 1.

11. A non-transitory computer-readable storage medium having stored thereon software comprising executable instructions to implement the method according to claim 1 when the software is executed by a processor.

* * * * *